United States Patent
Cho et al.

(10) Patent No.: US 12,517,987 B2
(45) Date of Patent: Jan. 6, 2026

(54) DEOBFUSCATION METHOD FOR DEOBFUSCATING AN OBFUSCATED MALICIOUS PROGRAM, A RECORDING MEDIUM AND A DEOBFUSCATION DEVICE THAT PERFORMS THE SAME

(71) Applicant: Foundation of Soongsil University-Industry Cooperation, Seoul (KR)

(72) Inventors: Haehyun Cho, Seoul (KR); Jeonghyun Yi, Daejeon (KR); Minho Kim, Seoul (KR); Gwangyeol Lee, Seoul (KR)

(73) Assignee: FOUNDATION OF SOONGSIL UNIVERSITY-INDUSTRY COOPERATION, Seoul (KR)

(*) Notice: Subject to any disclaimer, the term of this patent is extended or adjusted under 35 U.S.C. 154(b) by 42 days.

(21) Appl. No.: 18/578,600

(22) PCT Filed: Nov. 23, 2023

(86) PCT No.: PCT/KR2023/018981
§ 371 (c)(1),
(2) Date: Jan. 11, 2024

(87) PCT Pub. No.: WO2025/058130
PCT Pub. Date: Mar. 20, 2025

(65) Prior Publication Data
US 2025/0103686 A1    Mar. 27, 2025

(30) Foreign Application Priority Data
Sep. 11, 2023 (KR) .................. 10-2023-0120354

(51) Int. Cl.
G06F 21/14    (2013.01)
G06F 21/12    (2013.01)

(52) U.S. Cl.
CPC ............ *G06F 21/14* (2013.01); *G06F 21/125* (2013.01)

(58) Field of Classification Search
CPC .............................. G06F 21/14; G06F 21/125
(Continued)

(56) References Cited

U.S. PATENT DOCUMENTS 9,424,427 B1 * 8/2016 Chiriac ................ G06F 21/566
2017/0177868 A1   6/2017 Hay et al. ............. G06F 21/565

FOREIGN PATENT DOCUMENTS

KR    10-0926115 B1    11/2009
KR    10-1013417 B1     2/2011
(Continued)

OTHER PUBLICATIONS

Cheng, Binlin et al. "Obfuscation-Resilient Executable Payload Extraction From Packed Malware." *USENIX Security Symposium*, Aug. 13, 2021.
(Continued)

*Primary Examiner* — Michael S McNally
(74) *Attorney, Agent, or Firm* — Stein IP, LLC

(57) ABSTRACT

A method for a deobfuscation apparatus that deobfuscates a malicious program obfuscated using an obfuscation technique, and the deobfuscation method comprises executing the malicious program to identify and extract memory information containing a trampoline code used in the obfuscation technique, executing the trampoline code based on the memory information to classify a type of obfuscation technique of the malicious program, and deobfuscating the malicious program according to the classified obfuscation technique and generating a deobfuscation program. According to the constitution, the techniques for obfuscating OEP and IAT can be deobfuscated.

9 Claims, 16 Drawing Sheets

(58) Field of Classification Search
USPC .......................................................... 713/190
See application file for complete search history.

(56) References Cited

FOREIGN PATENT DOCUMENTS

| KR | 10-2016-0082644 A | 7/2016 |
|----|-------------------|--------|
| KR | 10-1833220 B1 | 2/2018 |
| KR | 10-1861341 B1 | 5/2018 |
| KR | 10-1969572 B1 | 4/2019 |
| KR | 10-2020-0131383 A | 11/2020 |
| KR | 10-2392559 B1 | 4/2022 |
| KR | 10-2392642 B1 | 4/2022 |
| KR | 10-2415971 B1 | 7/2022 |
| KR | 10-2023-0062204 A | 5/2023 |

OTHER PUBLICATIONS

Lee, Jae-hwi, et al. "A Study on API Wrapping in Themida and Unpacking Technique." *Journal of the Korea Institute of Information Security & Cryptology*, vol. 27, No. 1, Feb. 2017, pp. 67-77.
UPack PE header analysis + debugging, Dec. 31, 2016, URL: https://redscreen.tistory.com/131.

* cited by examiner

FIG. 5

```
1  Initialize Emulate Environment
2  Set the Entry Point to the Trampoline Code
3  while (1) {
4      Find return Instruction
5      Get the Stack value pointed by ESP
6      try {
7          Check the value
8      }
9      catch (unknown value) {
10         Continue the loop
11     }
12 }
```

FIG. 9A

```
00BD1299      call    <packingtestapp.__scrt_fastfail>
00BD129E      push    esi
00BD129F      call    <packingtestapp._exit>
00BD12A4      push    dword ptr ss:[ebp-20]
00BD12A7      call    <packingtestapp._exit>
00BD12AC      int3
00BD12AD      call    <packingtestapp.__security_init_cookie>
00BD12B2      jmp     <packingtestapp.__scrt_common_main_seh>
00BD12B7      push    ebp
00BD12B8      mov     ebp, esp
00BD12BA      push    0
00BD12BC      call    dword ptr ds:[<&SetUnhandledExceptionFilter>]
00BD12C2      push    dword ptr ss:[ebp+8]
00BD12C5      call    dword ptr ds:[<&UnhandledExceptionFilter>]
00BD12CB      push    C0000409
00BD12D0      call    dword ptr ds:[<&GetCurrentProcess>]
```

FIG. 9B

```
00F11299    call  packingtestapp_protected2.F1173D
00F1129E    push  esi
00F1129F    call  <JMP.&exit>
00F112A4    push  dword ptr ss:[ebp-20]
00F112A7    call  <JMP.&_Exit>
00F112AC    int3
00F112AD    jmp   packingtestapp_protected2.12CBC13
00F112B2    and   byte ptr ds:[esi-21],bh
00F112B5    sbb   ah,byte ptr ds:[edx+6AEC8B55]
00F112BB    add   bh,bh
00F112BD    adc   eax,<packingtestapp_protected2.&SetUnhandle
00F112C2    push  dword ptr ss:[ebp+8]
00F112C5    call  dword ptr ds:[<&UnhandledExceptionFilter>]
00F112CB    push  C0000409
00F112D0    call  dword ptr ds:[<&GetCurrentProcess>]
```

FIG. 10

```
>>Exploring -- 0x00ec1023 jmp 0x20ad
>>Exploring -- 0x00ec20d0 jmp 0x39e6e4
[Jmp to Other Section]  0x00ec20d0 -> 0x0125f7b4 push ebp
[Jmp to Origin Section] 0x00f13902 -> 0x00ec1d30 push ebp
------------------- [not Patched Instruction] -------------------
>>Exploring -- 0x00ec1023 jmp 0x20ad
>>Exploring -- 0x00ec20d0 jmp 0x39e6e4
ERROR: Invalid memory mapping (UC_ERR_MAP)
```

FIG. 11

```
 >>Exploring -- 0x00ec1023 jmp 0x20ad
 >>Exploring -- 0x00ec20d0 jmp 0x39e6e4
[Jmp to Other Section]  0x00ec20d0 -> 0x0125f7b4 push ebp
[Jmp to Origin Section] 0x00f13902 -> 0x00ec1d30 push ebp
 >>Exploring -- 0x00ec1d30 push ebp
 >>Exploring -- 0x00ec139d jmp 0x2eb3
 >>Exploring -- 0x00ec3250 push ebp
 >>Exploring -- 0x00ec327c call 0xf44
 >>Exploring -- 0x00ec31c0 push ebp
 >>Exploring -- 0x7607f390 jmp dword ptr [0x760e1878]
[Call API] 0x7607f390 GetSystemTimeAsFileTime
------------------ [Patch Instruction] ------------------
 >>Exploring -- 0x00ec1023 jmp 0x20ad
 >>Exploring -- 0x00ec20d0 jmp 0xc60
 >>Exploring -- 0x00ec1d30 push ebp
 >>Exploring -- 0x00ec139d jmp 0x2eb3
 >>Exploring -- 0x00ec3250 push ebp
 >>Exploring -- 0x00ec327c call 0xf44
 >>Exploring -- 0x00ec31c0 push ebp
 >>Exploring -- 0x7607f390 jmp dword ptr [0x760e1878]
[Call API] 0x7607f390 GetSystemTimeAsFileTime
```

FIG. 12A

| Address | Hex | | | | | | | | | | | |
|---|---|---|---|---|---|---|---|---|---|---|---|---|
| 00F2B000 | 70 | 5E | 7D | 77 | 5B | 9D | F5 | 00 | 62 | 36 | F8 | 00 | A0 | 20 | 06 | 01 |
| 00F2B010 | 21 | 6F | F5 | 00 | B9 | DA | FA | 00 | C6 | B1 | 0D | 01 | F9 | E3 | F3 | 00 |
| 00F2B020 | EB | C3 | FC | 00 | D0 | E3 | 0C | 01 | 0A | 6F | F3 | 00 | 37 | 59 | 0D | 01 |
| 00F2B030 | 11 | 13 | 0D | 01 | 7C | 78 | 0D | 01 | 60 | DF | 58 | 77 | F7 | 47 | 0E | 01 |
| 00F2B040 | B7 | 64 | FB | 00 | DF | C6 | F5 | 00 | 50 | 59 | 0D | 01 | 09 | C6 | F8 | 00 |
| 00F2B050 | 18 | D2 | F5 | 00 | 38 | CF | FC | 00 | 2E | 0F | F6 | 00 | 00 | 00 | 00 | 00 |
| 00F2B060 | 00 | 00 | 00 | 00 | 00 | 00 | 00 | 00 | 00 | 00 | 00 | 00 | 00 | 00 | 00 | 00 |
| 00F2B070 | 00 | 00 | 00 | 00 | 00 | 00 | 00 | 00 | 00 | 00 | 00 | 00 | 00 | 00 | 00 | 00 |
| 00F2B080 | 00 | 00 | 00 | 00 | 00 | 00 | 00 | 00 | 00 | 00 | 00 | 00 | 00 | 00 | 00 | 00 |
| 00F2B090 | 00 | 00 | 00 | 00 | 00 | 00 | 00 | 00 | F4 | CC | F8 | 00 | AE | C8 | F4 | 00 |
| 00F2B0A0 | 42 | DA | 0B | 01 | 64 | C9 | 02 | 01 | 6C | 52 | FC | 00 | C3 | EE | 05 | 01 |
| 00F2B0B0 | 81 | DD | F8 | 00 | CA | BE | 05 | 01 | 00 | 00 | 00 | 00 | 00 | 00 | 00 | 00 |
| 00F2B0C0 | 00 | 00 | 00 | 00 | 00 | 00 | 00 | 00 | 00 | 00 | 00 | 00 | 00 | 00 | 00 | 00 |
| 00F2B0D0 | 00 | 00 | 00 | 00 | 00 | 00 | 00 | 00 | 00 | 00 | 00 | 00 | 00 | 00 | 00 | 00 |
| 00F2B0E0 | 00 | 00 | 00 | 00 | 00 | 00 | 00 | 00 | C3 | 0E | 0B | 01 | 1F | 03 | FA | 00 |
| 00F2B0F0 | 94 | 15 | F3 | 00 | 19 | CA | F7 | 00 | 78 | AD | 06 | 01 | D7 | 53 | 09 | 01 |
| 00F2B100 | 0F | 6F | F3 | 00 | A1 | C2 | 07 | 01 | BA | 22 | F9 | 00 | 6F | F1 | F5 | 00 |
| 00F2B110 | 7A | D7 | F4 | 00 | 0D | B6 | F4 | 00 | BE | EE | 05 | 01 | 75 | FC | FF | 00 |

FIG. 12B

```
00F11000  00010000  ".textbss"
00F21000  00006000  ".text"
00F27000  00003000  ".rdata"
00F2A000  00001000  ".data"
00F2B000  00001000  ".idata"
00F2C000  00001000  ".msvcjmc"
00F2D000  00001000  ".00cfg"
00F2E000  00001000  ".rsrc"
00F2F000  00001000  ".reloc"
00F30000  00001000  ".imports"
00F31000  00384000  ".themida"
```

```
('0x778b6e70': 'RtlAllocateHeap'),
('0xc49d5b': 'IsDebuggerPresent'),
('0xc73662': 'RaiseException'),
('0xd520a0': 'MultiByteToWideChar'),
('0xc46f21': 'WideCharToMultiByte'),
('0xc9dab9': 'QueryPerformanceCounter'),
('0xdcb1c6': 'Wrong Address'),
('0xc2e3f9': 'GetSystemTimeAsFileTime'),
('0xcbc3ab': 'TerminateProcess'),
('0xdbe3d0': 'GetCurrentProcess'),
('0xc26f0a': 'GetProcAddress'),
('0xdc5937': 'FreeLibrary'),
('0xdc1311': 'VirtualQuery'),
('0xdc787c': 'GetProcessHeap'),
('0x7607df60': 'HeapFree'),
('0xdd47f7': 'GetCurrentThreadId'),
('0xca64b7': 'GetLastError'),
('0xc4c6df': 'GetModuleHandleW'),
('0xdc5950': 'IsProcessorFeaturePresent'),
('0xc7e638': 'GetStartupInfoW'),
('0xc4d218': 'SetUnhandledExceptionFilter'),
('0xcbcf38': 'UnhandledExceptionFilter'),
('0xc50f2e': 'RtlInitializeSListHead'),
('0xc7ccf4': '__vcrt_GetModuleFileNameW'),
('0xc3c8ae': '__except_handler4_common'),
('0xdada42': 'memset'),
('0xd1c964': '__current_exception_context'),
('0xcb526c': '__current_exception'),
('0xd4eec3': '__vcrt_GetModuleHandleW'),
('0xc7dd81': '__vcrt_LoadLibraryExW'),
('0xd4beca': '__std_type_info_destroy_list'),
('0xda0ec3': 'strcpy_s'),
('0xc9831f': 'strcat_s'),
('0xc21594': '__stdio_common_vsprintf_s'),
('0xc6ca19': '_set_new_mode'),
('0xd5ad75': '_initialize_onexit_table'),
('0xd833d7': '_register_onexit_function'),
('0xc26f0f': '_execute_onexit_table'),
('0xc86c2a1': '_crt_atexit'),
('0xc822be': '_crt_at_quick_exit'),
('0xc4f16f': '_controlfp_s'),
('0xc3d77a': 'terminate'),
('0xc3b60d': '_wmakepath_s'),
('0xd4ewbe': '_wsplitpath_s'),
('0xcafc75': 'wcscpy_s'),
('0xdce83c': '__p___commode'),
('0xc3d2b3': '_configthreadlocale'),
('0xd4bb2b': '_register_thread_local_exe_atexit_callback'),
('0xc3be00': '_c_exit'),
('0xdc0c30': '_cexit'),
('0xc4065f': '__p___argv'),
('0xd2c57d': '__p___argc'),
('0xc280c3': '_set_fmode'),
('0xcd55bc': '_exit'),
('0xc99329': 'exit'),
('0xd41933': '_initterm_e'),
('0xd884cf': '_initterm'),
('0xd04dfa': '_get_initial_narrow_environment'),
('0xc0107b': '_initialize_narrow_environment'),
('0xc77e2a': '_configure_narrow_argv'),
('0xca81e6': '__setusermatherr'),
('0xd17f1b': '_set_app_type'),
('0xda25fa': '_seh_filter_exe'),
('0xcc8674': 'CrtDbgReportW'),
('0xc49073': 'CrtDbgReport'),
('0xc26fae': '__stdio_common_vfprintf'),
('0xd496cc': 'getchar'),
('0xcd347d': '__acrt_iob_func'),
('0xc885a0': '_seh_filter_dll')
```

DEOBFUSCATION METHOD FOR DEOBFUSCATING AN OBFUSCATED MALICIOUS PROGRAM, A RECORDING MEDIUM AND A DEOBFUSCATION DEVICE THAT PERFORMS THE SAME

CROSS-REFERENCE TO RELATED APPLICATIONS

This application is a national stage of International Application No. PCT/KR2023/018981, filed Nov. 23, 2023, which claims the benefit of Korean Application No. 10-2023-0120354, filed Sep. 11, 2023, in the Korean Intellectual Property Office, the disclosures of which are incorporated herein by reference.

TECHNICAL FIELD

The present invention relates to a method for deobfuscating a malicious program obfuscated according to a trampoline code-based obfuscation technique, a recording medium, and a deobfuscation apparatus for performing the same.

BACKGROUND ART

FireEye's M-Trends report of the Year 2020 found that 31.28% of malicious code uses obfuscation techniques to evade detection. Obfuscation techniques, such as string encryption and API (Application Programming Interface) obfuscation, make the binary difficult to understand to prevent deobfuscation.

And because attackers use packers that compress code and data and decompress them when the program runs, it is difficult to detect malicious code using only static analysis tools.

Accordingly, researchers are working to solve the problem of using packing and obfuscation techniques in malicious code.

One of the main challenges in unpacking compressed malicious code is finding the original entry point (OEP) of the program. Since the unpacker finds the OEP first to dump the unpacked execution file in memory, the packer obfuscates the OEP, making it difficult to find. Packer then uses a trampoline code to defeat the OEP detection approach.

Typically, when an unpacker detects an OEP, it assumes that the compressed program is completely unpacked and loaded into memory. Accordingly, many research results show that packed programs to detect OEP perform many memory access operations to decompress or load compressed parts.

Then, the execution of the generated instructions is monitored to find the OEP. For example, existing approaches can detect OEPs when a program executes runtime-generated instructions within a compressed section.

However, a recent study found that 9.5% of packed malicious code samples use OEP obfuscation, and the OEP obfuscation technique used by packers restores the packer's trampoline code to OEP instead of the original code.

The trampoline code tricks the control flow in the OEP of a compressed program to prevent dumping of the execution file.

FIG. 1 is a diagram illustrating the control flow of a program obfuscated according to the OEP obfuscation technique.

As shown in FIG. 1, an unpacker that finds the OEP using either the memory address or the executed instruction section cannot successfully dump the original code because there are jump instructions for the trampoline code. Specifically, when running a compressed program, because of the code inserted by the packer, the OEP jumps first to the trampoline code, and then the trampoline code jumps to the program's OEP.

As a result, as shown in FIG. 1, when the unpacked program is executed, a runtime error occurs because the OEP instruction jumps to the wrong address, but deobfuscation for this OEP obfuscation technique is not considered.

Meanwhile, the importance of reconfiguring the import table to decrypt API obfuscation has been recognized. For this purpose, conventionally, a method, in which the unpacking routine monitors the virtual memory address written in the import table and restores it, is used.

However, because there is a packer that records the trampoline code address of the obfuscated API in the import table, the original import table cannot be restored using conventional methods.

FIG. 2 is a diagram illustrating the control flow of a program obfuscated according to an API obfuscation technique. As shown in FIG. 2, a program that has an import table with an incorrect virtual memory address of the API cannot be executed normally. To solve these API obfuscation techniques, it is needed to use dynamic analysis tools to understand how the trampoline code operates.

Accordingly, deobfuscation tools using existing dynamic analysis tools focused on reconfiguring the correct import table by deobfuscating the obfuscated IAT (Import Address Table).

However, despite successfully deobfuscating various existing protector obfuscation techniques, the structure in which one trampoline code can call multiple APIs is not considered.

Therefore, in the past, there were cases where deobfuscation failed to reconfigure the correct import table, and there was a limitation that the malicious code analysis results regenerated through this were inaccurate.

In addition, API-Xray, a tool for deobfuscating API-obfuscated malicious code, showed that deobfuscation is possible by successfully reconfiguring the import table when there is a one-to-one correspondence between the trampoline code and the API, but deobfuscation for 9.5% of the malicious code, to which OEP obfuscation is redundantly applied, failed.

Therefore, a method to deobfuscate the OEP and IAT obfuscation techniques is needed.

RELEVANT ART

Korean Patent Registration No. 10-1833220

DISCLOSURE

Technical Issues

The present invention is suggested to solve the above problems, and the purpose of the present invention is to provide a deobfuscation method for deobfuscating an obfuscated malicious program that can deobfuscate the OEP and IAT obfuscation technique, a recording medium and deobfuscation apparatus that perform the same.

Technical Solution

In order to achieve the above object, according to an embodiment of the present invention, a deobfuscation method in a deobfuscation apparatus that deobfuscates a malicious program obfuscated using an obfuscation technique comprises executing the malicious program to identify and extract memory information containing a trampoline code used in the obfuscation technique, executing the trampoline code based on the memory information to classify a type of obfuscation technique of the malicious program, and deobfuscating the malicious program according to the classified obfuscation technique and generating a deobfuscation program.

Further, the memory information may comprise at least one of an original code and data restored to a memory during execution of the malicious program, process context information that is context information about a CPU and memory, and a trampoline code address where the trampoline code is located.

Further, the trampoline code address may be an address of a basic block (BB), to which a call instruction of the trampoline code belongs.

Further, the classification of the type of obfuscation technique may comprises executing the trampoline code by configuring an environment identical to a process environment when the obfuscated malicious program was executed based on the original code and data, and process context.

Further, the classification of the type of obfuscation technique may comprise executing the trampoline code located at an original entry point (OEP) memory address that is an original entry point to obtain an address of a next original code, and storing an address of the original code as an address of an entry point (EP).

Further, the classifying the type of obfuscation technique may comprise, during the execution of the trampoline code, detecting a pattern of recording a decrypted application programming interface (API) address in a stack memory and executing a return instruction to obtain an address of an API, and generating an API address list.

Further, the classifying the type of obfuscation technique may further comprise classifying into at least one of an OEP obfuscation technique that patches a trampoline code call instruction to the OEP memory address and an API obfuscation technique that records a start address of the trampoline code in a memory area referenced by an indirect call instruction.

Further, the generation of the deobfuscation program may comprise reconfiguring an import address table (IAT) using the API address list and generating the deobfuscation program using at least one of the reconfigured IAT and the entry point address and instruction.

Further, the generation of the deobfuscation program may comprise reconfiguring an import address table (IAT) using the API address list and generating the deobfuscation program using at least one of the reconfigured IAT and the entry point address and instruction.

Meanwhile, the recording medium according to an embodiment of the present invention for achieving the above object is a computer-readable recording medium, on which a computer program for performing the deobfuscation method is recorded.

In order to achieve the above object, according to an embodiment of the present invention, a deobfuscation apparatus that deobfuscates a malicious program obfuscated using an obfuscation technique comprises a memory information extraction unit that executes the malicious program to identify and extract memory information containing a trampoline code used in the obfuscation technique, and a code execution unit that executes the trampoline code based on the memory information to classify a type of obfuscation technique of the malicious program, deobfuscates the malicious program according to the classified obfuscation technique, and generates a deobfuscation program.

Further, the memory information may comprise at least one of an original code and data restored to a memory during execution of the malicious program, process context information that is context information about a CPU and memory, and a trampoline code address where the trampoline code is located.

Further, the trampoline code address may be an address of e basic block (BB) to which a call instruction of the trampoline code belongs.

Further, the code execution unit may execute the trampoline code by configuring an environment identical to a process environment when the obfuscated malicious program was executed based on the original code and data, and process context.

Further, the code execution unit may execute the trampoline code located at an original entry point (OEP) memory address that is an original entry point to obtain an address of a next original code, and store an address of the original code as an address of an entry point (EP).

Further, the code execution unit, during the execution of the trampoline code, may detect a pattern of recording a decrypted application programming interface (API) address in a stack memory and executing a return instruction to obtain an address of an API and generate an API address list.

Further, the code execution unit may classify into at least one of an OEP obfuscation technique that patches a trampoline code call instruction to the OEP memory address and an API obfuscation technique that records a start address of the trampoline code in a memory area referenced by an indirect call instruction.

Further, the code execution unit may reconfigure an import address table (IAT) using the API address list and generate the deobfuscation program using at least one of the reconfigured IAT and the entry point address and instruction.

Advantageous Effects

According to one aspect of the present invention described above, techniques of obfuscating OEP and IAT can be deobfuscated by providing a deobfuscation method for deobfuscating an obfuscated malicious program, a recording medium and a deobfuscation apparatus for performing the same.

BRIEF DESCRIPTION OF DRAWINGS

These and/or other aspects will become apparent and more readily appreciated from the following description of the embodiments, taken in conjunction with the accompanying drawings in which:

FIG. 5 is a diagram illustrating the flow of executing a trampoline code in a code execution unit according to an embodiment of the present invention;

FIG. 9A is a diagram showing the OEP code of the original program, and FIG. 9B is a diagram showing the OEP code of a malicious program obfuscated according to the OEP obfuscation technique;

FIG. 10 is a diagram showing the process, in which a runtime error occurs in a malicious program obfuscated according to the OEP obfuscation technique;

FIG. 11 is a diagram showing the results of an experiment verifying the effectiveness of the deobfuscation method according to an embodiment of the present invention;

FIG. 12A is a diagram showing the IAT of a malicious program obfuscated according to the API obfuscation technique, and FIG. 12B is a diagram showing the memory map of a malicious program obfuscated according to an API obfuscation technique; and FIG. 13 (*a*) is a diagram showing the IAT of the original program, and FIG. 13 (*b*) is a diagram showing the IAT of a program deobfuscated according to the deobfuscation method of the present invention.

DETAILED DESCRIPTION OF EMBODIMENTS

Figure 1:
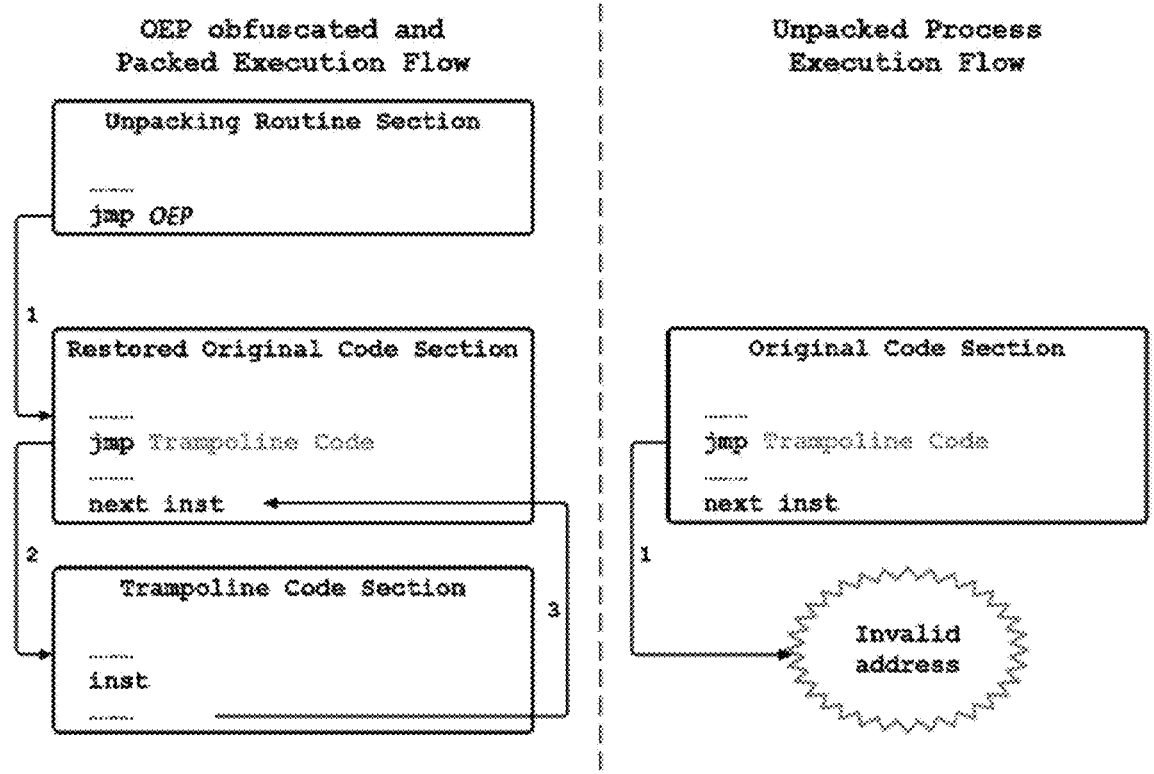
FIG. 1 is a diagram illustrating the control flow of a program obfuscated according to the OEP obfuscation technique.
Figure 2:
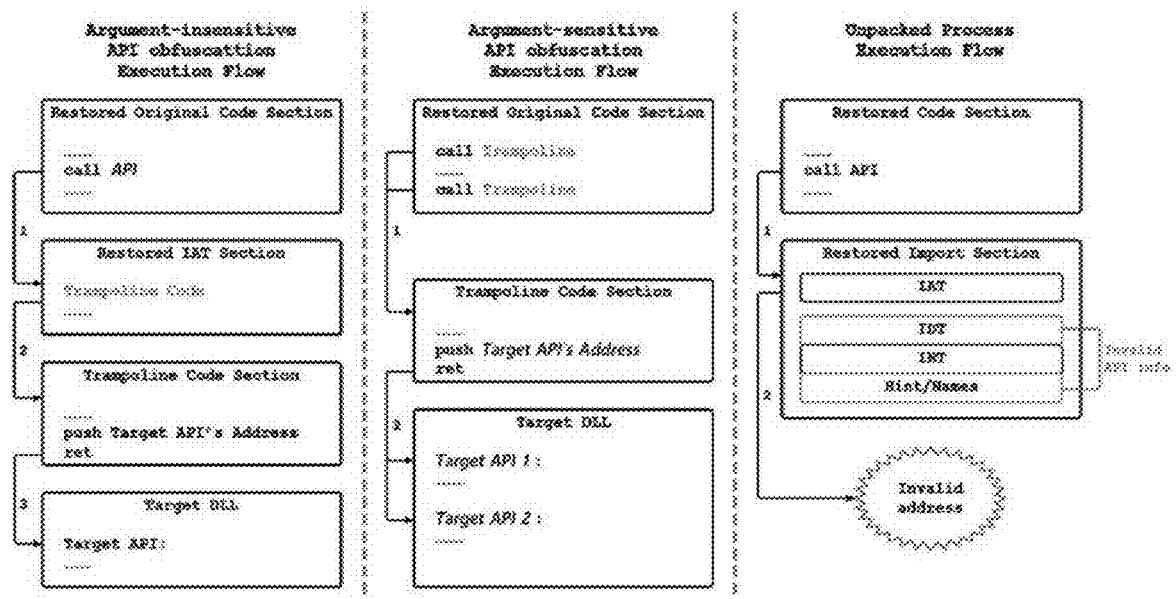
FIG. 2 is a diagram illustrating the control flow of a program obfuscated according to an API obfuscation technique.

The detailed description of the present invention which follows refers to the accompanying drawings which illustrate, by way of illustration, specific embodiments in which the present invention may be practiced. These embodiments are described in sufficient detail to enable those skilled in the art to practice the present invention. It should be understood that the various embodiments of the present invention are different from each other but are not necessarily mutually exclusive. For example, specific shapes, structures, and characteristics described herein may be implemented in another embodiment without departing from the spirit and scope of the invention in connection with one embodiment. Additionally, it should be understood that the location or arrangement of individual components within each disclosed embodiment may be changed without departing from the spirit and scope of the invention. Accordingly, the detailed description set forth below is not to be taken in a limiting sense, and the scope of the present invention, if properly described, is limited only by the appended claims, along with all equivalents as claimed by those claims. Like reference numbers in the drawings indicate the same or similar function throughout the various aspects.

In addition, the components according to the present invention are components defined not by physical division but by functional division, and may be defined by the functions that each performs. Each component may be implemented as hardware or program codes and processing units that perform respective functions, and functions of two or more components may be included in one component and implemented. Therefore, the names given to the components in the following embodiments are not to physically distinguish each component, but to imply the representative function performed by each component, and it should be noted that the technical idea of the present invention is not limited by the names of the components.

Hereinafter, preferred embodiments of the present invention will be described in more detail with reference to the drawings.

Figure 3:
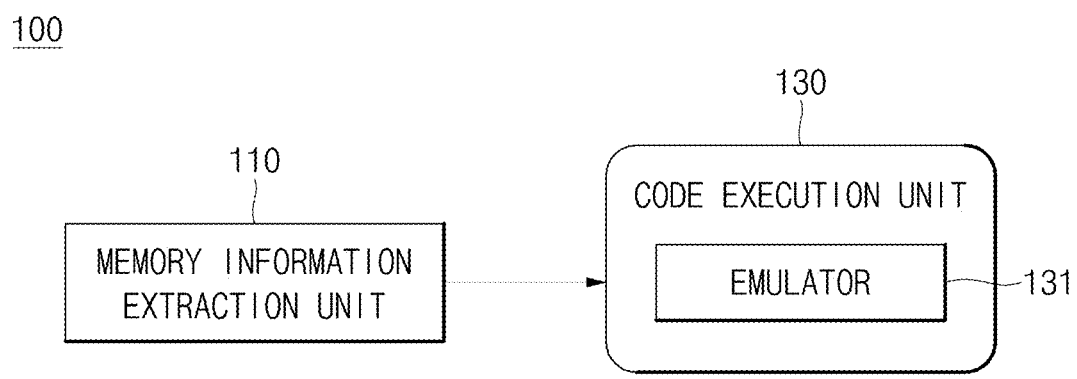
FIGS. 3 and 4 are block diagrams for explaining the configuration of a deobfuscation apparatus according to an embodiment of the present invention.
Figure 4:
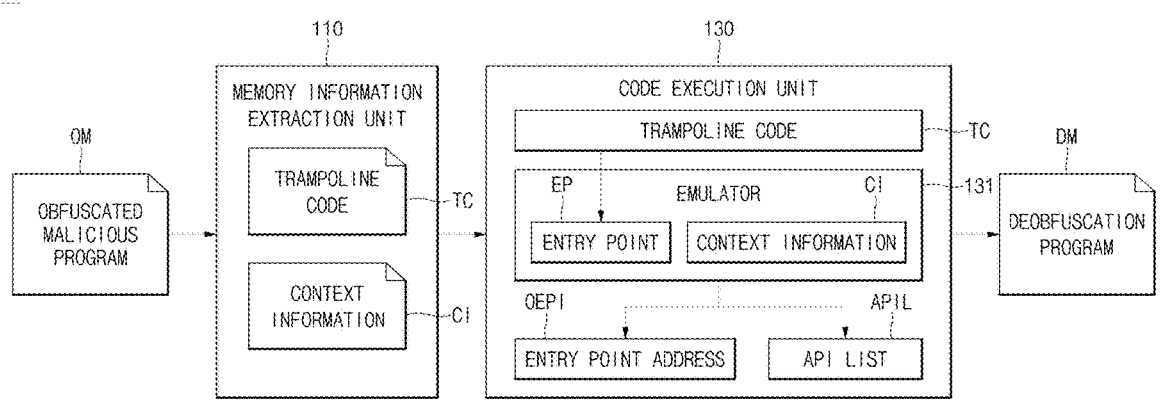

FIGS. 3 and 4 are block diagrams for explaining the configuration of the deobfuscation apparatus 100 according to an embodiment of the present invention.

The deobfuscation apparatus 100 (hereinafter referred to as apparatus) according to this embodiment is provided to deobfuscate a malicious program (code) (OM) that has been obfuscated using an obfuscation technique.

To this end, the apparatus 100 according to this embodiment may include a memory information extraction unit 110 and a code execution unit 130. In addition, the apparatus 100 may have software (application) installed and executed to perform the deobfuscation method, and the memory information extraction unit 110 and the code execution unit 130 can be controlled by software (application) for performing the deobfuscation method.

At this time, the apparatus 100 may be a separate terminal or a partial module of the terminal. Additionally, the memory information extraction unit 110 and the code execution unit 130 may be formed as an integrated module or may be comprised of one or more modules. However, on the contrary, each component may be comprised of a separate module.

Additionally, the apparatus 100 may be mobile or fixed. This apparatus 100 may be in the form of a server or engine, and may be called by other terms such as a device, terminal, user equipment (UE), mobile station (MS), wireless device or handheld device. And the apparatus 100 can execute or produce various software based on an operating system (OS), that is, a system. Here, the operating system is a system program that allows software to use the hardware of the apparatus, and includes both mobile computer operating systems such as Android OS, iOS, Windows Mobile OS, Bada OS, Symbian OS, and Blackberry OS, as well as computer operating systems such as Windows, Linux, Unix, MAC, AIX, and HP-UX.

Additionally, the apparatus 100 according to this embodiment may further include a storage unit (not shown), in which a program for performing a deobfuscation method is recorded. In addition, the storage unit may temporarily or permanently store the data processed by the memory information extraction unit 110 and the code execution unit 130, and include a volatile storage medium or a non-volatile storage medium, but the scope of the present invention is not limited thereto.

This storage unit (not shown) stores data accumulated while performing the deobfuscation method.

The memory information extraction unit 110 according to this embodiment can receive an obfuscated malicious program (OM) through an input device or communication device.

The memory information extraction unit 110 is provided to identify and extract memory information by executing an obfuscated malicious program (OM).

The memory information extraction unit 110 may use a dynamic analysis tool to identify and extract memory information. Additionally, the memory information extracted by the memory information extraction unit 110 may include an instruction that calls a trampoline code (TC) used in an obfuscation technique.

This memory information extraction unit 110 may extract the trampoline code (TC) call instruction and context information (CI) used to obfuscate the execution information and OEP or API on the virtual memory by executing an obfuscated malicious program (OM), as memory information.

Here, the memory information may include at least one of original code and data, context information (CI), and trampoline code (TC) address.

The original code and data are original code and data temporarily restored on virtual memory, and may mean extraction of code and data sections that are loaded and restored to the virtual memory space during the execution of a packed and obfuscated malicious program (OM).

The context information (CI) may refer to process context information, which is context information about a CPU and memory.

The memory information extraction unit 110 may extract context information (CI) by recording information about the context of the process and thread in order to enable the code execution unit 130 to emulate the process.

For example, the context information (CI) may include PEB (Process Environment Block) information, TEB (Thread Environment Block) information that is a thread environment block, data stored in the CPU register and the stack, and the stack location of each thread.

Specifically, CPU registers may include general registers such as RAX, RBX, RCX, and RDX, pointer registers such as RBP, RSP, and RIP, index registers such as RSI and RDI, and flag registers such as RFLAGS.

The memory information extraction unit 110 may dump the virtual memory in which the program to be unpacked is executed (i.e., process) to record the names, addresses, and permissions of the program sections, and check whether the name and permission of each section are changed while executing the target program.

Through this, the context information (CI) may include PEB information, TEB information, program header, section, heap, and stack.

The memory information extraction unit 110 may parse and record the API name and address of each DLL (Dynamic Link Library) to detect the obfuscated API and rewrite the import table to include the DLL information in the context information (CI).

The memory information extraction unit 110 can extract the trampoline code address where the trampoline code (TC) is located as memory information.

This trampoline code address may be the address of the basic block (BB) to which the trampoline code call instruction belongs.

Specifically, when the memory information extraction unit 110 analyzes the obfuscated malicious program (OM) through a dynamic analysis tool, it can identify when the protector's bootstrap code completes restoration of the original code and data.

In order to run in an environment similar to the dumped process during the execution of the trampoline code (TC), all of the code and data of the process and sections of the DLL loaded in virtual memory can be extracted. Additionally, in the section of the extracted original program, there are trampoline codes (TC) inserted by the protector for obfuscation.

Accordingly, the trampoline code (TC) branches from the original code to the protector's bootstrap code or code in the heap memory through a call instruction, so the starting address of the trampoline code can be found by checking the branch address.

Therefore, the memory information extraction unit 110 can be used to identify obfuscated information by executing all call instructions of the trampoline code (TC) collected through this method.

At this time, the memory information extraction unit 110 may distinguish between cases where the execution result of the trampoline code (TC) is affected and cases where it does not, depending on the instruction executed immediately before the trampoline code call instruction.

Instructions that affect execution results have the characteristic of belonging to basic blocks, such as trampoline code call instructions. In order to obtain the correct execution result of the trampoline code, not simply executing only the trampoline code call instruction, but all instructions of the basic block to which the trampoline code call instruction belongs should be executed to identify the information protected by the trampoline code.

Conversely, instructions that do not affect the execution result are obfuscated by executing only the trampoline code call instruction, making it possible to identify protected information. Existing API deobfuscation tools identify obfuscated information and reconfigure deobfuscated programs only for cases where instructions executed before trampoline code execution do not affect the execution result of trampoline code (TC).

However, the memory information extraction unit 110 according to the present embodiment is used to deobfuscate both cases in which trampoline code execution is affected and cases in which the trampoline code execution is not affected. So it extracts the address of the basic block to which the trampoline code call instruction belongs as the address of the trampoline code, unlike other conventional tools.

The memory information extraction unit 110 may transmit the extracted memory information to the code execution unit 130.

The code execution unit 130 executes the trampoline code (TC) based on the memory information, classifies the type of obfuscation technique of the malicious program (OM), and deobfuscates the malicious program (OM) according to the classified obfuscation technique to generate a deobfuscation program (DM).

The code execution unit 130 may include an emulator 131 to execute the trampoline code (TC) or may mean the emulator 131 itself.

When executing the trampoline code (TC) on the emulator 131, the code execution unit 130 may use the original code and data, and the process context to configure an environment identical to the process environment when the obfuscated malicious program (OM) is executed.

FIG. 5 is a diagram for explaining the flow of executing the trampoline code (TC) in the code execution unit 130 according to an embodiment of the present invention.

As shown in FIG. 5, the code execution unit 130 configures the emulator 131 environment based on context information (CI) including original code and data and process context extracted in advance.

Additionally, the code execution unit 130 may add the DLL information included in the context information (CI) to the environment to make it identical to the process environment in which the obfuscated malicious program (OM) was executed.

After performing this initialization process, the code execution unit 130 may set the trampoline code address included in the memory information as the entry point (EP) address of the emulator 131 and execute the trampoline code (TC).

Additionally, the code execution unit 130 may observe whether a return (ret) instruction is executed during the process of repeatedly executing the trampoline code (TC) and check the stack memory value indicated by the ESP register by the ret instruction.

The code execution unit 130 may search for obfuscated information by executing the trampoline code (TC) until the stack memory value is a meaningful memory address.

Here, the meaningful memory address may refer to the API address of a DLL loaded into virtual memory or the address of a code area that is executed after branching from the original, non-obfuscated code.

In addition, the code execution unit 130 may classify the type of obfuscation technique of the malicious program (OM) into at least one of the OEP obfuscation technique and the API obfuscation technique through the execution result of the trampoline code (TC).

The OEP obfuscation technique may refer to a technique of patching a trampoline code call instruction to the OEP (Original Entry Point) memory address, which is the original entry point.

The API obfuscation technique can be a technique that records the starting address of the trampoline code (TC) in the memory area referenced by the code patch or indirect call instruction.

Figure 6:
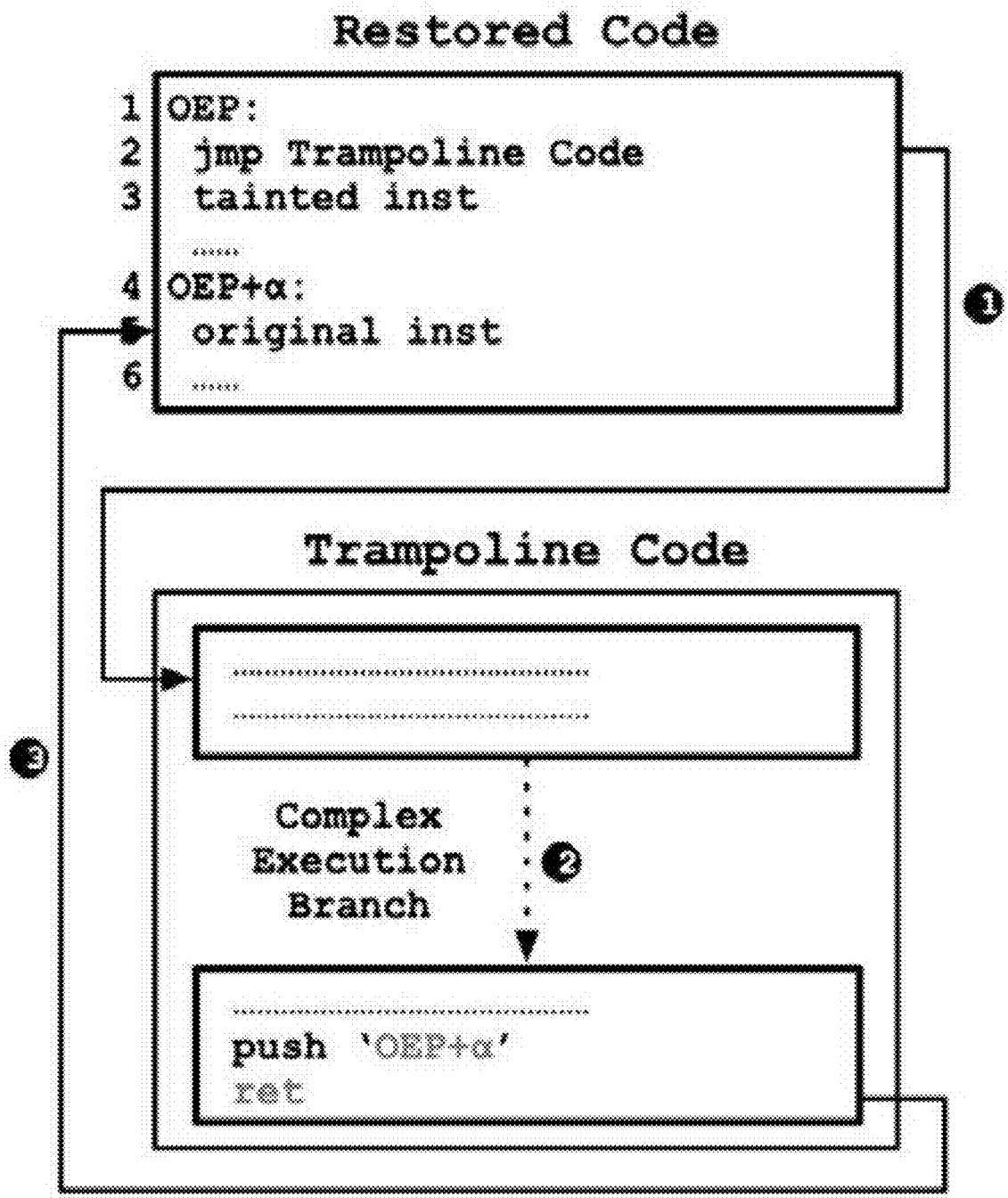
FIG. 6 is an example diagram illustrating a process, in which a code execution unit obtains the address of a normal execution flow according to an embodiment of the present invention.

FIG. 6 is an example diagram to explain a process, in which the code execution unit 130 obtains the address of a normal execution flow according to an embodiment of the present invention.

Specifically, the OEP obfuscation technique applies obfuscation in the form of a code patch, and the trampoline code call instruction is stored in the OEP memory address. This causes the obfuscated malicious program (OM) to call the trampoline code (TC) as soon as it enters the original entry point. The trampoline code (TC) stores the address where the original entry point instruction before obfuscation branches in the stack memory and executes the return instruction to execute the original code after the original entry point.

Accordingly, the code execution unit 130 may execute the trampoline code (TC) located at the original entry point (OEP) memory address to obtain the address of the next original code, and store the address of the original code as the address (OEPI) of the entry point (EP). The entry point address (OEPI) stored in this way can be used as a function of a deobfuscation tool.

Figure 7:
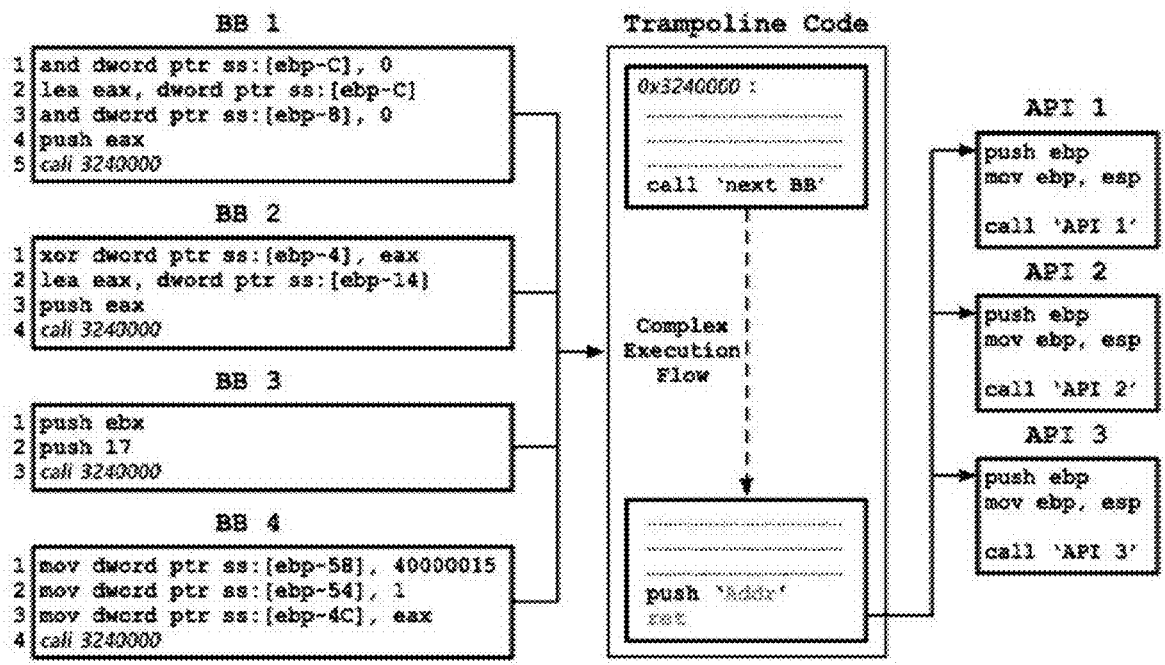
FIG. 7 is an example diagram illustrating a process, in which the code execution unit obtains an API address when multiple APIs correspond to one trampoline code according to an embodiment of the present invention.

FIG. 7 is an example diagram illustrating a process, in which the code execution unit 130 obtains an API address when multiple APIs correspond to one trampoline code according to an embodiment of the present invention.

The trampoline code (TC), similar to the OEP obfuscation technique, stores the address of the API called before obfuscation in the stack memory and executes the return instruction to execute the actual API.

Therefore, the code execution unit 130 may execute a direct or indirect trampoline code call instruction, detect a pattern of recording the decrypted API (Application Programming Interface) address in the stack memory and executing a return instruction during execution of the trampoline code (TC) to obtain the address of the API and generate an API address list (APIL).

And the code execution unit 130 may reconfigure the import address table (IAT) using the API address list (APIL), and generate a deobfuscation program (DM) using at least one of the entry point address (OEPI), instruction, and reconfigured IAT.

Therefore, the apparatus 100 according to this embodiment can be used to generate deobfuscated binaries targeting malicious programs to which an obfuscation technique based on trampoline code insertion has been applied.

Figure 8:
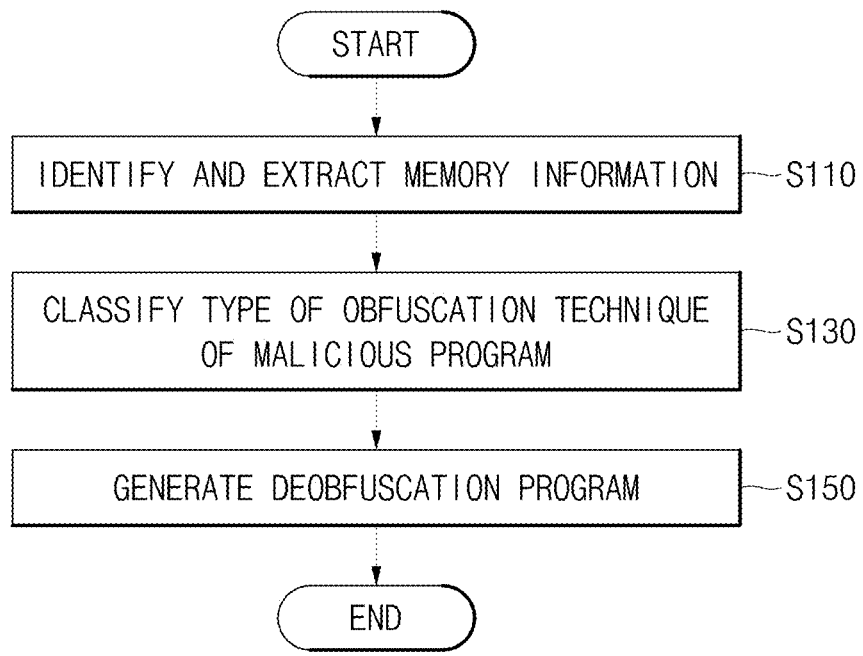
FIG. 8 is a flowchart illustrating a deobfuscation method according to an embodiment of the present invention.

FIG. 8 is a flowchart for explaining a deobfuscation method according to an embodiment of the present invention. Since the deobfuscation method according to an embodiment of the present invention proceeds on substantially the same configuration as that of the deobfuscation apparatus 100 of FIGS. 3 and 4, the same reference numerals will be assigned to the same components, and repeated descriptions will be omitted.

The deobfuscation method according to this embodiment includes a step of identifying and extracting memory information (S110), a step of classifying the type of obfuscation technique of a malicious program (S130), and a step of generating a deobfuscation program (S150).

In the step of identifying and extracting memory information (S110), the memory information extraction unit 110 may execute a malicious program to identify and extract memory information including instructions that call the trampoline code used in the obfuscation technique.

The memory information extracted in the step of identifying and extracting memory information (S110) may include at least one of original code and data, context information, and trampoline code address.

The original code and data may refer to code and data restored to the memory during the execution of a malicious program.

The process context information may be context information about a CPU and memory.

The trampoline code address is the address where the trampoline code is located, and may be the address of the basic block (BB) to which the trampoline code call instruction belongs.

In the step (S130) of classifying the types of obfuscation techniques of malicious programs, the code execution unit 130 may classify the types of obfuscation techniques of malicious programs by executing the trampoline code based on memory information.

In the step (S130) of classifying the type of obfuscation technique of a malicious program, the code execution unit 130 may configure an environment identical to the process environment when the obfuscated malicious program was executed based on the original code, data, and process context, and execute the trampoline code.

In the step (S130) of classifying the type of obfuscation technique of the malicious program, the code execution unit 130 may execute the trampoline code located at the OEP (Original Entry Point) memory address, which is the original entry point to obtain the address of the next original code, and store the address of the original code as the address of the entry point (EP).

In addition, in the step (S130) of classifying the type of obfuscation technique of a malicious program, the code execution unit 130 may detect a pattern of recording the decrypted API (Application Programming Interface) address in the stack memory and executing a return instruction while executing the trampoline code, and generate a list of API addresses.

In the step (S130) of classifying the type of obfuscation technique of the malicious program, the code execution unit 130 may classify the type of obfuscation technique into at least one of OEP obfuscation technique that patches the trampoline code call instruction to the OEP memory address, and API obfuscation technique that records the start address of the trampoline code in the memory area referenced by the indirect call instruction.

In the step of generating a deobfuscation program (S150), the code execution unit 130 may deobfuscate a malicious program according to a classified obfuscation technique and generate a deobfuscation program.

In the step of generating the deobfuscation program (S150), the code execution unit 130 may reconfigure the IAT (Import Address Table) using the API address list, and use at least one of the entry point address, instruction and the reconfigured IAT to generate a deobfuscation program.

The deobfuscation method of the present invention can be implemented in the form of program instructions that can be executed through various computer components and recorded on a computer-readable recording medium. The computer-readable recording medium may include program instructions, data files, data structures, etc., singly or in combination.

The program instructions recorded on the computer-readable recording medium may be specially designed and configured for the present invention, or may be known and usable by those skilled in the computer software field.

Examples of the computer-readable recording media include magnetic media such as hard disks, floppy disks and magnetic tapes, optical recording media such as CD-ROMs and DVDs, and magneto-optical media such as floptical disks, and hardware devices specifically configured to store and perform program instructions, such as ROM, RAM, flash memory, etc.

Examples of the program instructions include not only machine language code such as that generated by a compiler, but also high-level language code that can be executed by a computer using an interpreter or the like. The hardware device may be configured to operate as one or more software modules to perform processing according to the invention and vice versa.

The method according to this embodiment showed through experiments that deobfuscation is possible for binaries obfuscated by three different protectors (Themida, VMProtect, ASProtect).

Below, the efficiency of the deobfuscation method of the present invention, which unpacks and deobfuscates the program provided by Themida using the OEP obfuscation technique and the API obfuscation technique will be described.

First, FIG. 9A is a diagram showing the OEP code of the original program, FIG. 9B is a diagram showing the OEP code of a malicious program obfuscated according to the OEP obfuscation technique, and FIG. 10 is a diagram showing the process, in which a runtime error occurs in a malicious program obfuscated according to the OEP obfuscation technique.

As shown in FIGS. 9A and 9B, it can be seen that the malicious program obfuscated according to the OEP obfuscation technique immediately jumps directly to the trampoline code.

In other words, Themida (v3.0.7)'s EntryPoint-Virtualzation option modifies the instructions of the program's OEP or basic block executed after the OEP.

As shown in FIG. 10, in a malicious program obfuscated according to the OEP obfuscation technique, it can be seen that the OEP obfuscated code simply dumps the execution file in memory and then accesses an unmapped memory area, resulting in a runtime error.

The deobfuscation method according to this embodiment can detect the trampoline code used for OEP obfuscation, similar to Algorithm 1 below. The deobfuscation method can then patch the obfuscated code and branch to the original code. Algorithm 1 below is a deobfuscation algorithm for Themida OEP obfuscation.

---
Algorithm 1 Deobfuscation algorithms for Themida OEP Obfuscation.
---
Input: Current Instruction (curINS)
Output: Obfuscated OEP's Address
1. OEP_TrampolineCode_List ← Trampoline Code's address in OEP
2. Trace_Flag ← False
3. if curINS = OEP_TrampolineCode\...List then
4.     prevIP ← curINS
5.     Trace_Flag ← True
6. end if
7. if curINS ⊂ OrigianlCodeSection and Trace_Log = True then
8.     Trace_Flag ← False
9.     curIP ← curINS
10. end if
---

FIG. 11 is a diagram showing the results of an experiment verifying the effectiveness of the deobfuscation method according to an embodiment of the present invention.

Specifically, FIG. 11 shows the execution result of the patched program, that is, the deobfuscated program. As shown in FIG. 11, it can be seen that the deobfuscated program according to the present invention is executed identically to the original program.

Therefore, the deobfuscation method according to this embodiment can solve OEP obfuscation by analyzing the trampoline code.

Meanwhile, Themida (v3.0.7)'s API-Wrapping option obfuscates all APIs in the original IAT of the compressed program. All trampoline code in Themida is argument-insensitive, and unlike previous versions and other packers, Themida stores all trampoline code in the ".themida" section.

FIG. 12A is a diagram showing the IAT of a malicious program obfuscated according to the API obfuscation technique, and FIG. 12B is a diagram showing the memory map of a malicious program obfuscated according to the API obfuscation technique.

Themida's unpacking routine records the trampoline code of the wrapped API in the original IAT location, as shown in FIG. 12, and the deobfuscation method according to this embodiment parses all addresses to identify the obfuscated API, and run independently. For this purpose, deobfuscation is performed according to Algorithm 2 below, and Algorithm 2 is a deobfuscation algorithm for the Themida API obfuscation.

---
Algorithm 2 Deobfuscation algorithms for Themida API Obfuscation.
---
Input: Current Instruction (curINS)
Output: Obfuscated API's Address
1. API_TrampolineCode_List ← Trampoline Code's address in IAT
2. DllInfo_List ← DLL's information
3. Trace_Flag ← False
4. if curINS = API_TrampolineCode_List then
5.     Trace_Flag ← True
6. end if
7. if Trace_Log = True and curINS_Opcode = "ret" then
8.     if *ESP ⊂ DllInfo_List then
9.         Trace_Flag ← False
10.        API_TrampolineCode_List ← API_TrampolineCode_List + 1
11.        curINS ← API_TrampolineCode_List
12.     end if
13. end if
---

As can be seen through Algorithm 2 above, the deobfuscation method of the present invention executes all trampoline code blocks to solve API obfuscation.

FIG. 13A is a diagram showing the IAT of the original program, and FIG. 13B is a diagram showing the IAT of the program deobfuscated according to the deobfuscation method of the present invention.

As shown in FIGS. 13A and 13B, it can be seen that the deobfuscation method of the present invention can successfully deobfuscate a malicious program according to the API obfuscation technique.

Although various embodiments of the present invention have been shown and described above, the present invention is not limited to the specific embodiments described above. The present invention can be modified and practiced by those skilled in the technical field to which the present invention pertains without departing from the gist of the present invention claimed in the claims, and these modifications should not be individually understood from the technical spirit or perspective of the present invention.

REFERENCE NUMERAL

100: deobfuscation apparatus
110: memory information extraction unit
130: code execution unit
131: emulator

The invention claimed is:

1. A method for a deobfuscation apparatus that deobfuscates a malicious program obfuscated using an obfuscation technique comprising:
   executing the malicious program to identify and extract memory information containing a trampoline code used in the obfuscation technique;
   executing the trampoline code based on the memory information to classify a type of obfuscation technique of the malicious program into at least one of an original entry point (OEP) obfuscation technique that patches a trampoline code call instruction to the OEP memory address and an application programming interface (API) obfuscation technique that records a start address of the trampoline code in a memory area referenced by an indirect call instruction; and
   deobfuscating the malicious program according to the classified obfuscation technique and generating a deobfuscated program,
   wherein the deobfuscating the malicious program comprises,
   when the obfuscation technique is the OEP obfuscation technique, executing the trampoline code located at an OEP memory address that is an original entry point to obtain an address of a next original code, storing an address of the original code as an address of an entry point (EP), and generating the deobfuscated program using the address of the EP,
   when the obfuscation technique is the API obfuscation technique, during the execution of the trampoline code, detecting a pattern of recording a decrypted API address in a stack memory and executing a return instruction to obtain an address of an API, generating an API address list, reconfiguring an import address table (IAT) using the API address list and generating the deobfuscated program using the reconfigured IAT.

2. The method of claim 1, wherein the memory information comprises at least one of,
   an original code and data restored to a memory during execution of the malicious program;
   process context information that is context information about a CPU and memory; and
   a trampoline code address where the trampoline code is located.

3. The method of claim 2, wherein the trampoline code address is an address of a basic block (BB), to which a call instruction of the trampoline code belongs.

4. The method of claim 2, wherein the classifying the type of obfuscation technique comprises,
   executing the trampoline code by configuring an environment identical to a process environment when the obfuscated malicious program was executed based on the original code and data, and process context.

5. A computer-readable recording medium having stored thereon a computer program comprising instructions that, when executed by a processor, cause the processor to:
   execute a malicious program that is obfuscated using an obfuscation technique to identify and extract memory information containing a trampoline code used in the obfuscation technique,
   execute the trampoline code based on the memory information to classify a type of obfuscation technique of the malicious program into at least one of an original entry point (OEP) obfuscation technique that patches a trampoline code call instruction to the OEP memory address and an application programming interface (API) obfuscation technique that records a start address of the trampoline code in a memory area referenced by an indirect call instruction, and
   deobfuscate the malicious program according to the classified obfuscation technique and generate a deobfuscated program,
   wherein the instructions, when executed by the processor, further cause the processor to,
   when the obfuscation technique is the OEP obfuscation technique, execute the trampoline code located at an OEP memory address that is an original entry point to obtain an address of a next original code, store an address of the original code as an address of an entry point (EP), and generate the deobfuscated program using the address of the EP,
   when the obfuscation technique is the API obfuscation technique, during the execution of the trampoline code, detect a pattern of recording a decrypted API address in a stack memory and executing a return instruction to obtain an address of an API, generate an API address list, reconfigure an import address table (IAT) using the API address list and generate the deobfuscated program using the reconfigured IAT.

6. A deobfuscation apparatus that deobfuscates a malicious program obfuscated using an obfuscation technique comprising:
   one or more processors; and
   a memory for storing one or more instructions,
   wherein the one or more processors execute the stored one or more instructions to perform operations comprising,
   executing the malicious program to identify and extract memory information containing a trampoline code used in the obfuscation technique; and
   executing the trampoline code based on the memory information to classify a type of obfuscation technique of the malicious program into at least one of an original entry point (OEP) obfuscation technique that patches a trampoline code call instruction to the OEP memory address and an application programming interface (API) obfuscation technique that records a start address of the trampoline code in a memory area referenced by an indirect call instruction, deobfuscating the malicious program according to the classified obfuscation technique, and generating a deobfuscated program, wherein the deobfuscating the malicious program comprises, when the obfuscation technique is the OEP obfuscation technique, executing the trampoline code located at an OEP memory address that is an original entry point to obtain an address of a next original code, storing an address of the original code as an address of an entry point (EP), and generating the deobfuscated program using the address of the EP, when the obfuscation technique is the API obfuscation technique, during the execution of the trampoline code, detecting a pattern of recording a decrypted API address in a stack memory and executing a return instruction to obtain an address of an API, generating an API address list, reconfiguring an import address table (IAT) using the API address list and generating the deobfuscated program using the reconfigured IAT.

7. The apparatus of claim 6, wherein the memory information comprises at least one of,
- an original code and data restored to a memory during execution of the malicious program;
- process context information that is context information about a CPU and memory; and
- a trampoline code address where the trampoline code is located.

8. The apparatus of claim 7, wherein the trampoline code address is an address of e basic block (BB) to which a call instruction of the trampoline code belongs.

9. The apparatus of claim 7, wherein the executing the trampoline code comprises:
    executing the trampoline code by configuring an environment identical to a process environment when the obfuscated malicious program was executed based on the original code and data, and process context.

* * * * *